(12) United States Patent
Van der Steen et al.

(10) Patent No.: US 7,410,375 B2
(45) Date of Patent: Aug. 12, 2008

(54) CARD CONNECTOR WITH EJECTING MECHANISM

(75) Inventors: Hendrikus P. G. Van der Steen, Den Dungen (NL); Jen-Jou Chang, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/644,915

(22) Filed: Dec. 21, 2006

(65) Prior Publication Data

US 2007/0141878 A1    Jun. 21, 2007

(51) Int. Cl.
*H01R 13/62* (2006.01)

(52) U.S. Cl. ..................................... 439/159

(58) Field of Classification Search ................. 439/159, 439/157, 188; 200/51.09; 235/451, 474
See application file for complete search history.

(56) References Cited

U.S. PATENT DOCUMENTS

| | | | |
|---|---|---|---|
| 6,508,402 B1 * | 1/2003 | Takada et al. ............... | 235/451 |
| 6,520,784 B2 * | 2/2003 | Ito et al. ..................... | 439/159 |
| 6,572,392 B2 * | 6/2003 | Motojima .................... | 439/159 |
| 6,609,919 B2 | 8/2003 | Ito et al. | |
| 6,767,232 B1 * | 7/2004 | Tien ........................... | 439/159 |
| 6,929,491 B1 * | 8/2005 | Chi-Te ....................... | 439/159 |
| 6,948,960 B1 * | 9/2005 | Chen .......................... | 439/159 |
| 7,086,882 B2 * | 8/2006 | Kodera et al. ............... | 439/159 |
| 7,118,397 B1 * | 10/2006 | Su et al. ..................... | 439/159 |

* cited by examiner

*Primary Examiner*—Alexander Gilman
(74) *Attorney, Agent, or Firm*—Wei Te Chung (57) ABSTRACT

A card connector (100) for receiving a card (5), includes an insulative housing (1) having a card receiving space (11), a number of contacts (2) mounted in the insulative housing to contact with the card and an eject mechanism (3). The eject mechanism defines a slider (6) movably mounted on the housing and engageable with the card, a spring (10) for biasing the slider to move in a direction opposite to an insertion direction of the card, a cam mechanism including an cam (61) and a cam groove (62) formed around the cam having a starting point (62a), and a pin member (9) movable within the cam groove. The cam includes a first recessed portion (62c) and a second recessed portion (62e) both communicating with the cam groove, the pin member disengages from the first recessed portion and the second recessed portion upon ejection of the card.

20 Claims, 10 Drawing Sheets

CARD CONNECTOR WITH EJECTING MECHANISM

BACKGROUND OF THE INVENTION

1. Field of the Invention

The present invention generally relates to a card connector for connecting an integrated circuit card, and more particularly to a card connector having an ejecting mechanism for removing the card from the connector.

2. Description of Related Art

Nowadays, memory cards such as Multimedia card (MMC), Secure Digital card (SD), Smart Media card (SM), Memory Stick (MS) and the like, are widely used for storing electrical data information, correspondingly, various types of card connectors are available for connecting the mating cards to a given electronic device, such as a digital camera, a personal computer, so that information is able to be transmitted therebetween.

A conventional card connector as disclosed in U.S. Pat. No. 6,508,402 typically comprises an insulative housing defining a card receiving room and mounted with a plurality of contacts, a slider movably attached to the housing for facilitating ejection of the card, and a coil spring continuously urging the slider to move in an ejection direction of the card. A known heart-shaped groove is formed on the housing to cooperate with a pin member movably mounted therein, thereby controlling forward and backward movement of the slider. While retracting the card, an user pushes the card in the card insertion direction slightly, then the card is ejected by the slider and the spring to move outwardly and automatically, till an end of the card is exposed outside, such that the user can snatch the card and draw the card out of the connector. Insertion and ejection of the card are performed by a double push operation. A problem with said connector is that while the card is ejected by the slider under great restoring force of the coil spring, the card moves outwardly so fast, and tends to fly out of the card connector and even drops onto the ground. In this case, the card may be damaged due to impact of collision, and data information in the card may be lost.

A card connector of U.S. Pat. No. 6,767,232 is provided with a switch for detecting the presence of the card, the switch is normally open without insertion of the card. Said switch is composed of a stationary terminal and a movable terminal for contacting with the stationary terminal. In case of the insertion of the card, the movable terminal comes into contact with the stationary terminal to close the switch, accordingly, a memory system of the electronic device starts to allow data transmission between the card and the electronic device. Upon ejection of the card, the card is ejected outwardly to make switch open, and then the memory system switches off. Finally, contacts of the card disconnect with the card connector. However, since the card may be withdrawn too fast such that there is not enough time for a memory system of the electronic device to be turned off before the card disconnects from the card connector, that is to say, electrical connections between said card and the electronic device are broken when data transmissions are still in process, therefore, there is a risk of lost data.

It is thus desired to provide a card connector to overcome the shortcomings described above.

SUMMARY OF THE INVENTION

An object of the present invention is to provide a card connector for preventing the card inserted therein from falling out.

Another object of the present invention is to provide a card connector for allowing data to be transmitted more reliably and safely.

In order to achieve above-mentioned object, a card connector for receiving a card, comprises an insulative housing having a card receiving space, a plurality of contacts mounted in the insulative housing to contact with the card, and an eject mechanism. The eject mechanism defines a slider movably mounted on the housing and engageable with the card, a spring for biasing the slider to move in a direction opposite to an insertion direction of the card, a cam mechanism including an cam and a cam groove formed around the cam and having a starting point, and a pin member for movement within the cam groove. Said cam defines a first recessed portion and a second recessed portion both communicating with the cam groove. The pin member is movable within the cam groove and disengage from the first recessed portion and the second recessed portion upon ejection of the card.

Other objects, advantages and novel features of the present invention will become more apparent from the following detailed description of the present embodiment when taken in conjunction with the accompanying drawings.

DETAILED DESCRIPTION OF THE INVENTION

Reference will now be made to the drawing figures to describe the preferred embodiment of the present invention in detail.

Figure 1:
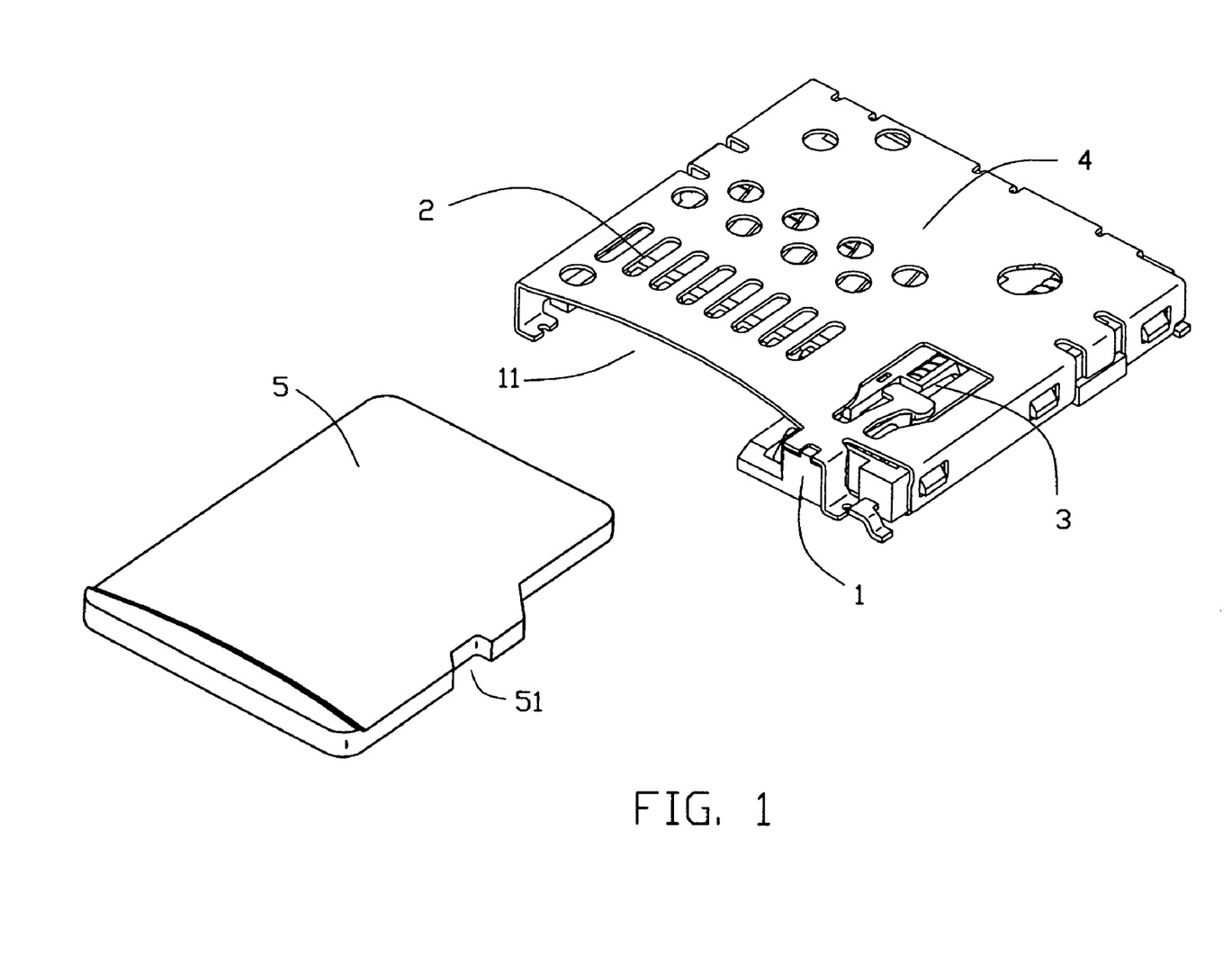
FIG. 1 is an assembled perspective view of a card connector with a corresponding card according to the present invention.
Figure 2:
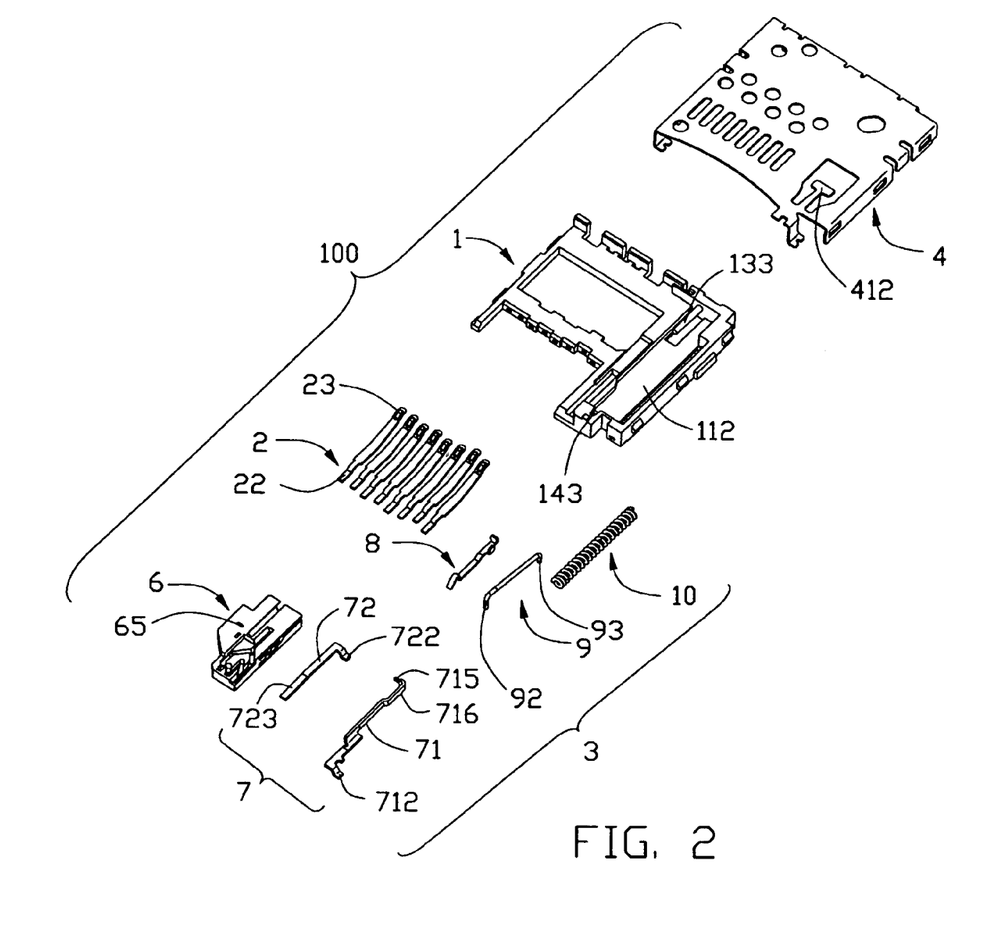
FIG. 2 is an exploded perspective view of the card connector of FIG. 1.

Referring to FIGS. 1 and 2, a card connector 100 according to the present invention is used for connecting a card 5 to an electronic device (not shown), comprises an insulative housing 1 and a shell 4 covering the housing 1 to form a card receiving space 11. The housing 1 has a plurality of contacts 2 mounted thereon, said contacts 2 each has a contacting portion 23 at one end thereof for engaging contact pads on a side face of the card 5 and a tail portion 22 at the other end thereof for connection, as by soldering to appropriate circuit traces on a printed circuit board (not shown).

The card connector 100 is provided with an ejecting mechanism 3 comprising a slider 6 mounted to the housing 1, a pin member 9 and a coil spring 10 continuously urging the slider 6 in an ejecting direction of the card. The slider 6 is movably mounted within a recess portion 112 along a side portion of the housing 1 and is covered by the shell 4. The slider 6 includes a cam portion 61 on an upper surface thereof and a cam groove 62 formed around the cam portion 61. A guide end 93 of the pin member 9 moves freely within the cam groove 62 to control the forward and backward movement of the slider 6, the other end 92 of the pin member 9 rotatably mounted within a hole 143 formed on a front end of the housing 1. The shell 4 has a spring arm 412 extending toward the card receiving space 11 for biasing the pin member 9, and restraining the free end 93 within the cam groove 62.

Figure 3:
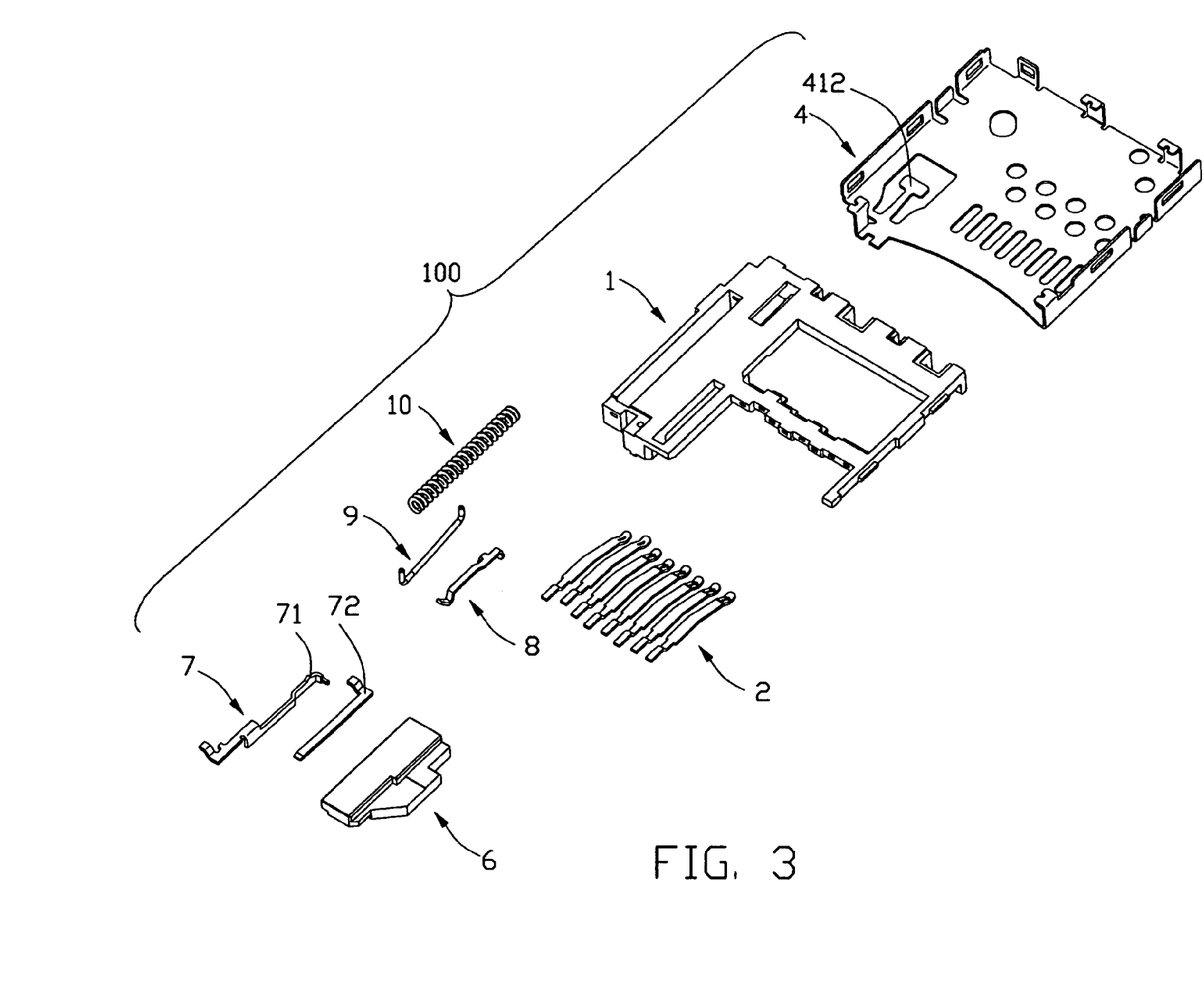
FIG. 3 is a view similar to FIG. 2, while taken from a different aspect.

The housing 1 further includes a cylindrical projection 133 on rear side wall thereof for holding one end of the coil spring 10 in a coaxial manner, the other end of the coil spring 10 is disposed within a receiving hole 66 provided on a rear side of the slider 6, thus the coil spring 10 is sandwiched between the housing 1 and the slider 6. Said spring 10 is used to apply a resilient force to the slider 6 so that the slider 6 is intended to move outwardly automatically.

The card connector 100 further has a detection switch 7 mounted on the housing 1 to switch off a memory system of the electronic device, said switch 7 includes a stationary terminal 72 and a movable terminal 71 adapted to be brought into contact with the stationary terminal 72. A tail end 712 of the movable terminal 71 is located at a front side of the housing 1 to be soldered onto the printed circuit board. The slider 6 is further provided with an island portion 63 and a guide groove 64 around the island portion 63 on a side face thereof, the guide groove 64 is adapted to guide the movement of a bent end 715 of the movable terminal 71. Said guide groove 64 has an upper passage 642, an below passage 644 located beneath said upper passage 642, two connecting passages 641, 643 adapted to be interconnected to the upper passage 642 and the below passage 643 and being spaced from each other.

A deflectable arm 716 is formed between the tail end 712 and the bent end 715 of the movable terminal 71 to contact with the stationary terminal 72 upon insertion of the card 5. A tail end 722 of the stationary terminal 72 is soldered onto the printed circuit board at a rear side of the housing 1. The stationary terminal 72 comprises a contacting arm 723 disposed beneath the deflectable arm 716.

The slider 6 comprises a pair of position holes 65 in which a locking tab 8 is retained, said locking tab 8 is deflectable to move in a direction substantially vertical to the card insertion direction. When the card 5 is inserted in the receiving space 11, the locking tab 8 is depressed downwardly. When a cutout 51 formed on a side of the card 5 is in alignment with a distal end of the locking tab 8, the distal end of the locking tab 8 moves upwardly to lock the card 5 to the slider 6.

Figure 4:
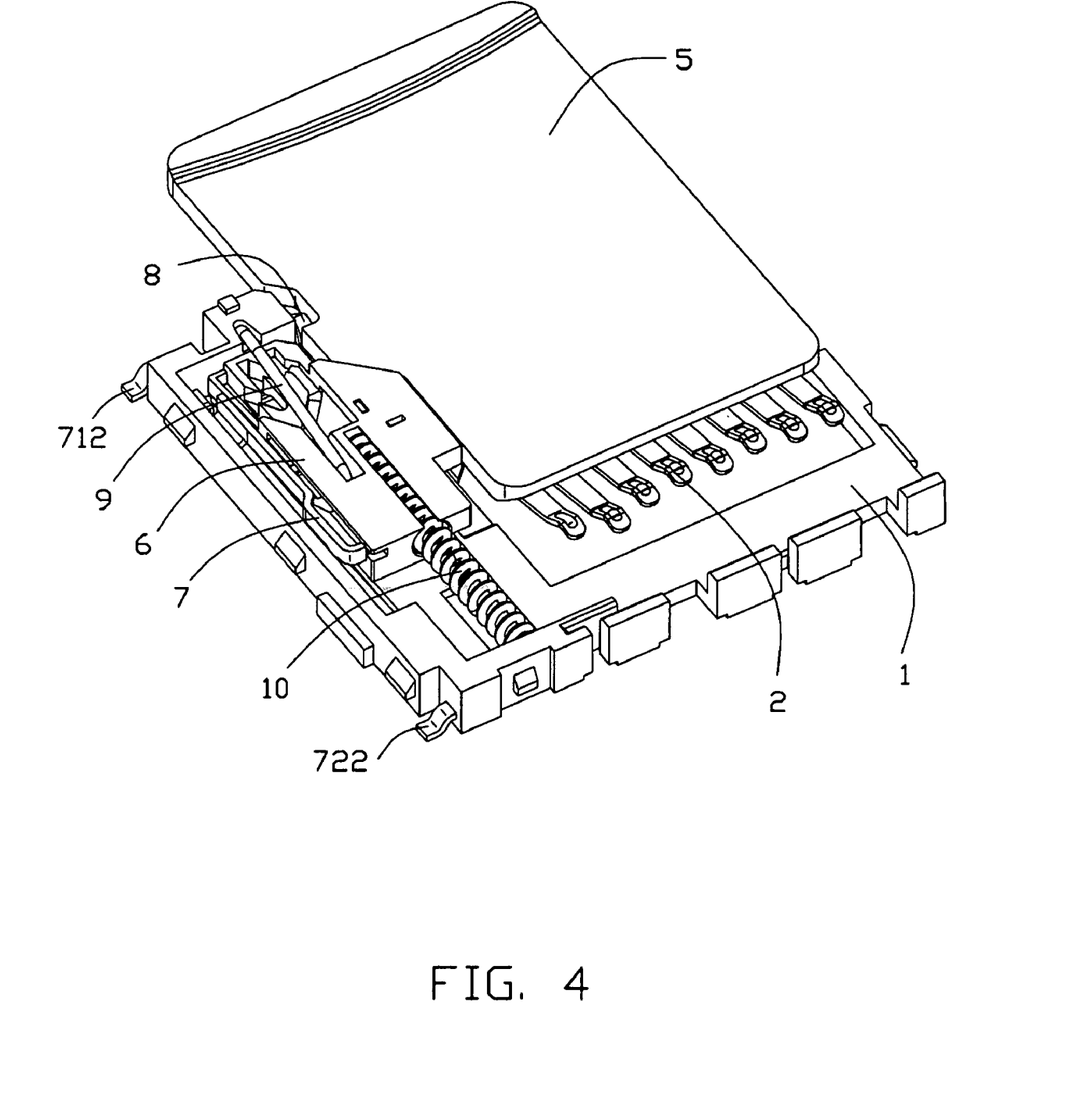
FIG. 4 is a perspective view showing an initiate state when the card abuts against a slider of the card connector with a shell taken away, but without any movement of slider.
Figure 5:
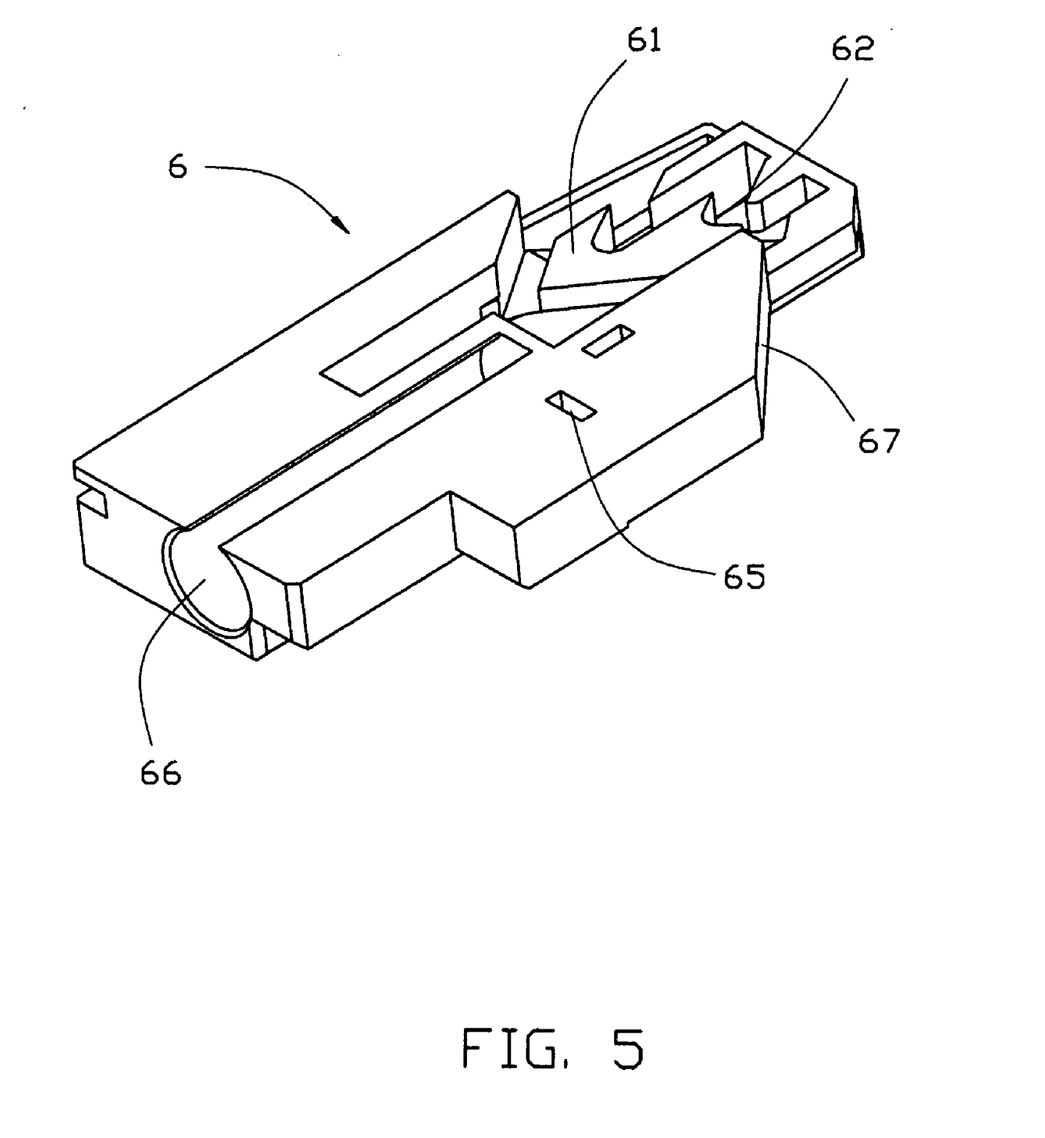
FIG. 5 is a perspective view of the slider shown in FIG. 4.
Figure 6:
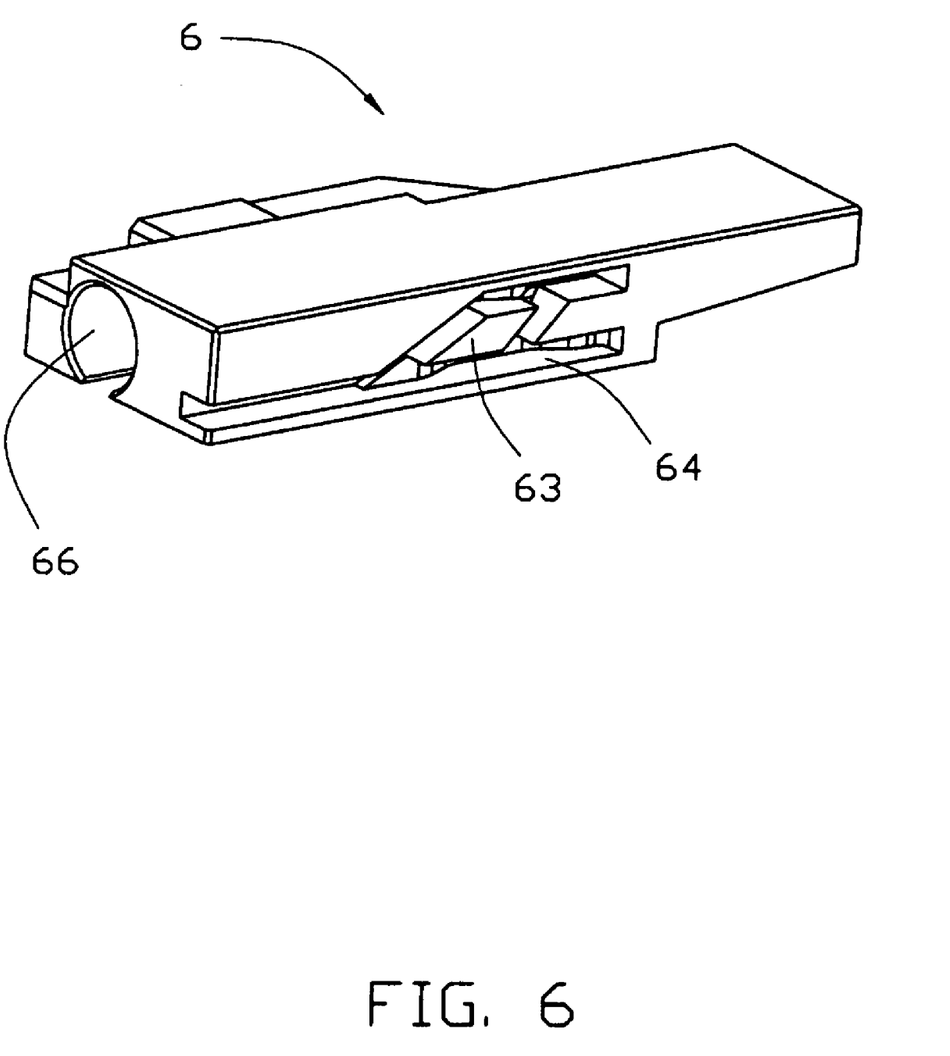
FIG. 6 is a view similar to FIG. 5, while taken from a different aspect.
Figure 7:
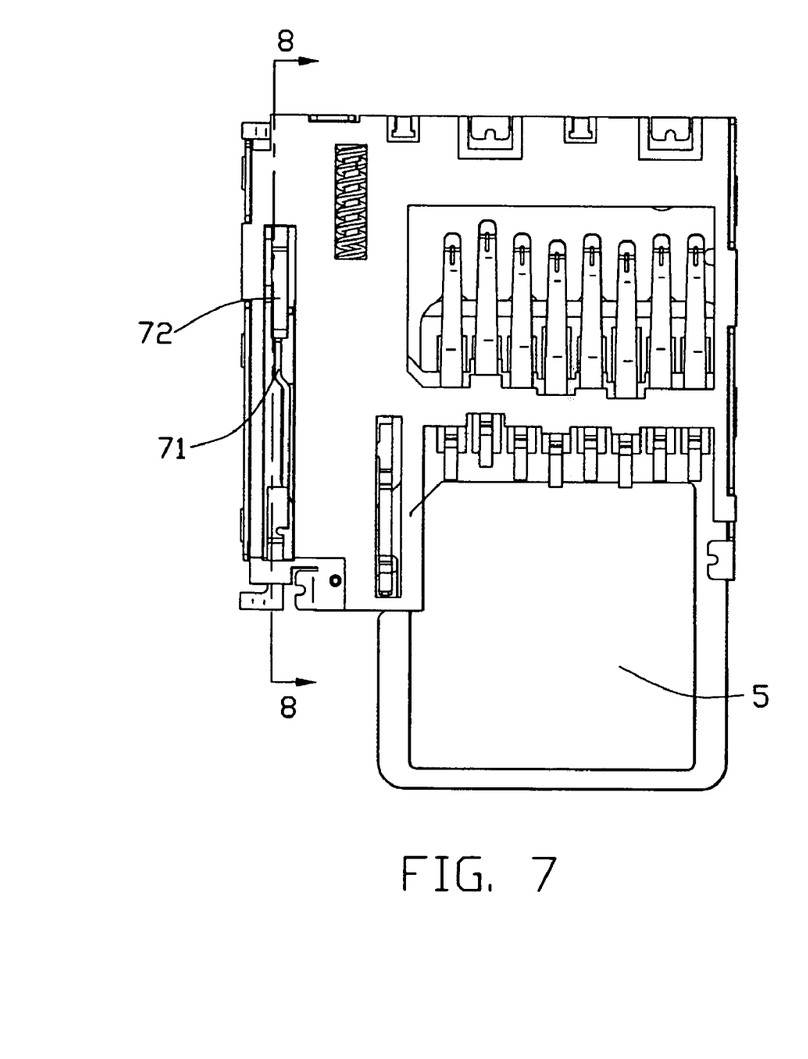
FIG. 7 is a bottom plane view the card connector with the card preliminary inserted therein.
Figure 8:
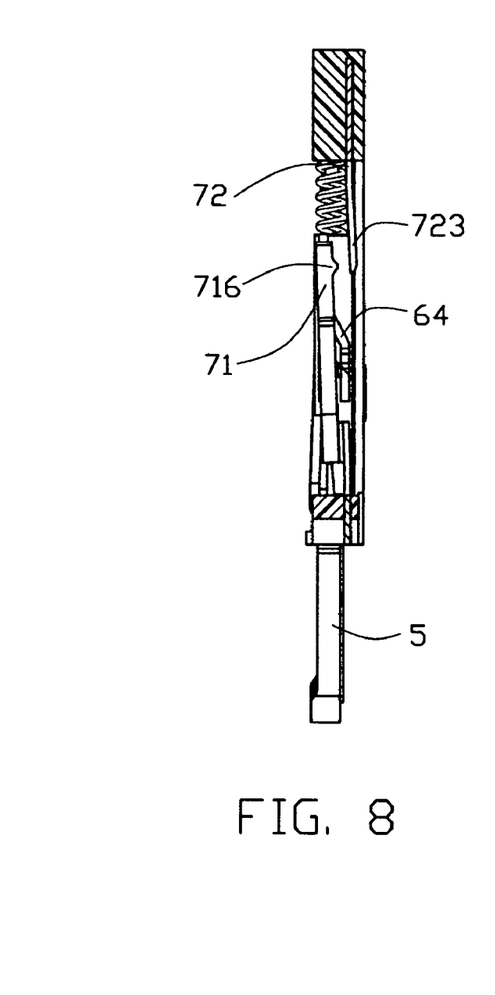
FIG. 8 is a cross-sectional view of the card connector taken along line 8-8 of FIG. 7.
Figure 9:
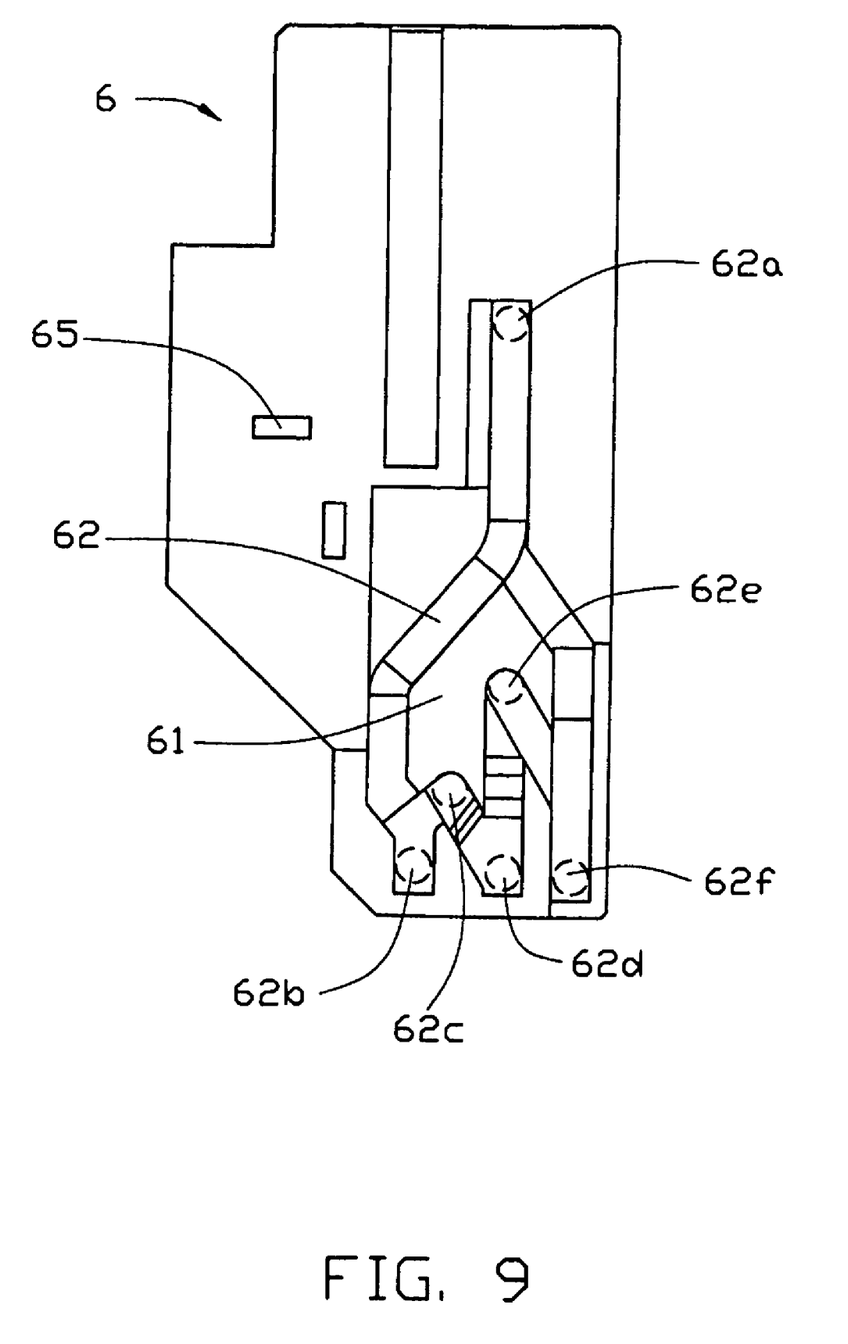
FIG. 9 is a top plane view of the slider of the card connector.
Figure 10:
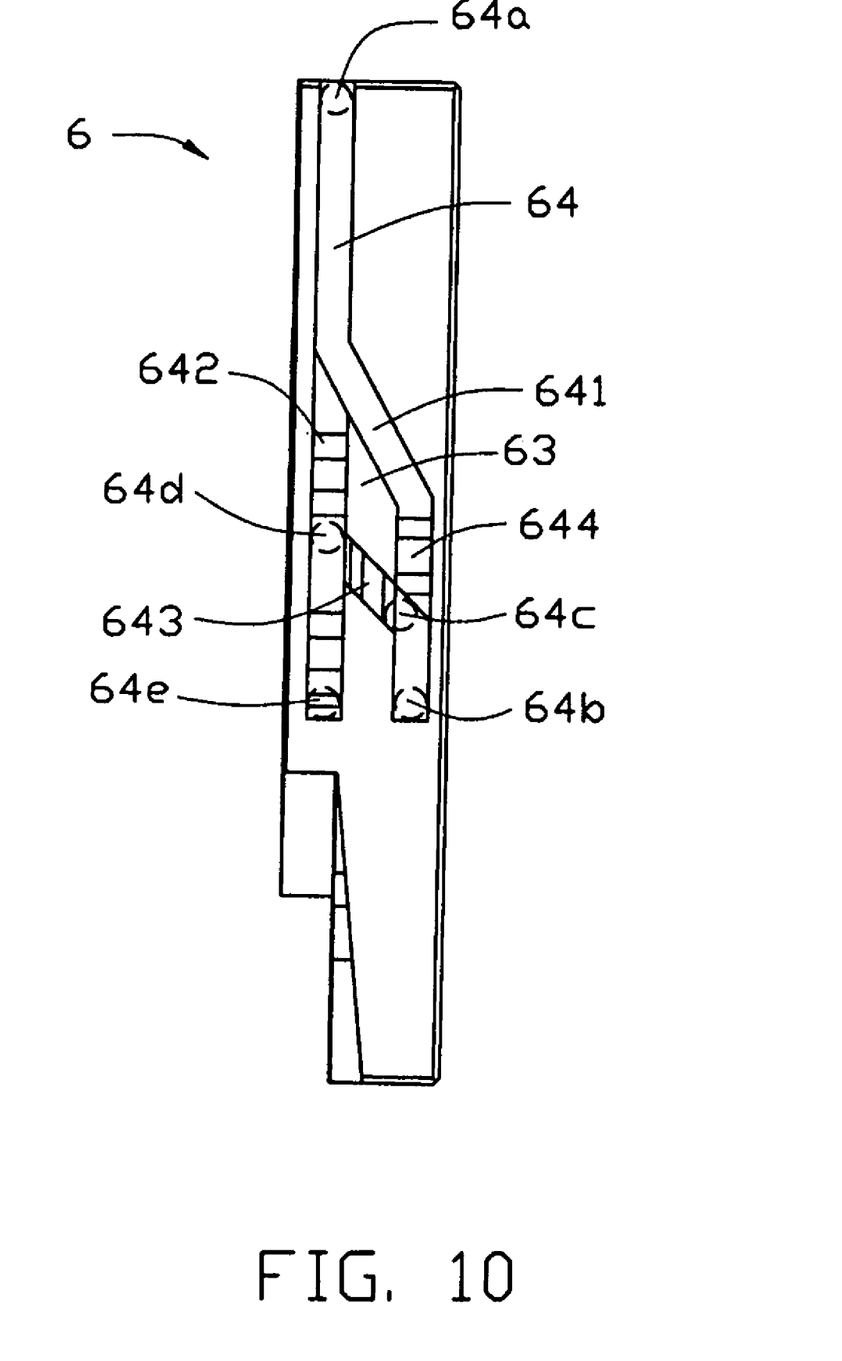
FIG. 10 is a side elevational view of the slider of the card connector.

In use, an user pushes the card 5 forwardly into the receiving space 11, the card 5 abuts against an inclined surface 67 provided on a left side wall of the slider 6, the card 5 comes into contact with the contacts 2, the lock tab 8 locks the card 5 to the slider 6, and the switch 7 is open.

Thereafter, the slider 6 moves forward along the recess portion 112 of the housing 1, at the same time, the free end 93 of the pin member 9 slides from a starting point 62a of the cam groove 62, the coil spring 10 is compressed and applies an ejecting force to the slider 6. When the card 5 and the slider 6 are further inwardly pushed till the free end 93 of the pin member 9 reaches a first end point 62b of the cam groove 62, at this time, the bent end 715 of the movable terminal 71 travels from an initial point 64a of the guide groove 64 and reaches a first abutting point 64b located beneath the initial point 64a, the deflectable arm 716 of the movable terminal 71 moves downwardly and contacts with the contacting arm 723 of the stationary terminal 72, thus making the switch 7 closed.

When the pushing force from the user stops, the slider 6 is ejected to move backwardly under the restoring force of the coil spring 10, the free end 93 of the pin member 9 travels from the first end point 62b of the cam groove 62 and finally stopped by a first recessed portion 62c formed inwardly on the cam 61. Meanwhile, the bent end 715 of the movable terminal 71 slides from the first abutting point 64b, and arrives at a first turning point 64c which is located behind and at the same level as the first abutting point 64b, and the switch 7 remains closed to allow data transmission. The insertion of the card 5 is performed by a push operation.

While retracting the card 5 from the card connector 100, the user pushes the card 5 inwardly in the insertion direction once, the slider 6 moves forwardly slightly, the free end 93 of the pin member 9 escapes from the first recessed portion 62c, and then reached a second end point 62d, said second end point 62d is at the same level as the first end point 62b. Accordingly, the bent end 715 of the movable terminal 71 travels from the first turning point 64c and returns to the first abutting point 64b, and the switch 7 keeps closed.

When the user stops the pushing force, the slider 6 is ejected to move outwardly, the free end 93 of the pin member 9 moves from the second end point 62d and abuts against a second recessed portion 62e, the movement of the slider 6 is halted. The second recessed portion 62e is formed inwardly on the cam 61 and positioned between the first recessed portion 62c and the starting point 62a. Both the first recessed portion 62c and the second recessed portion 62e are generally V-shaped cutout. Meanwhile, the bent end 715 of the movable terminal 71 travels from the first abutting point 64b and returns to the first turning point 64c, and then moves upwardly to reach a turning point 64d, the deflectable arm 716 of the movable terminal 71 moves upwardly to disengage from the contacting arm 723 of the stationary terminal 72, thus the switch 7 becomes open.

Thereafter, the card 5 with the slider 6 is pushed inwardly once again till the card 5 and the slider 6 can not be further inserted, the free end 93 of the pin member 9 escapes from the second recessed portion 62e, and arrives at a third end point 62f which is at the same level as the second end point 62d. At the same time, the bent end 715 of the movable terminal 71 travels from the second turning point 64d and reaches a second abutting point 64e. Said second abutting point 64e is at the same level as the second turning point 64d and the initial point 64a, and is aligned with the first abutting point 64b along a height direction of the slider 6. The switch 7 keeps open.

When the card 5 with the slider 6 is released from the pushing force, the card 5 and the slider 6 are ejected to moves backwardly, the free end 93 of the pin member 9 travels from the third end point 62f and returns to the starting point 62a. Meanwhile, the bent end 715 of the movable terminal 71 travels through the second abutting point 64e and the second turning point 64d, and finally returns to the initial point 64a. The switch 7 keeps open and the contacts 2 still electrically connect with the card 5. Thus the ejecting operation of the card 5 is finished, and an end of the card 5 is exposed outside. The user can grip the end of the card 5 and pull the card 5 outwardly, the card 5 disengages from both the contacts 2 and the locking tab 8 and finally moves out of the card connector 100. Alternatively, the cam groove 62 may be formed on the housing 1.

Both the first recessed portion 62c and the second recessed portion 62e communicate with the cam groove 62, the guide end 93 of the pin member 9 is configured to be located in the first recessed portion 62c and the second recessed portion 62e. The ejection of the card 5 has to be completed by a double push operation to make the guide end 93 escape from the first recessed portion 62c and the second recessed portion 62e, thus the card connector 100 is provided with a time delay function. There is enough time to switch off a memory system of the electronic device before the electrical connection between the contacts 2 and the card 5 is broken, thereby avoiding risks of lost data.

Figure 11:
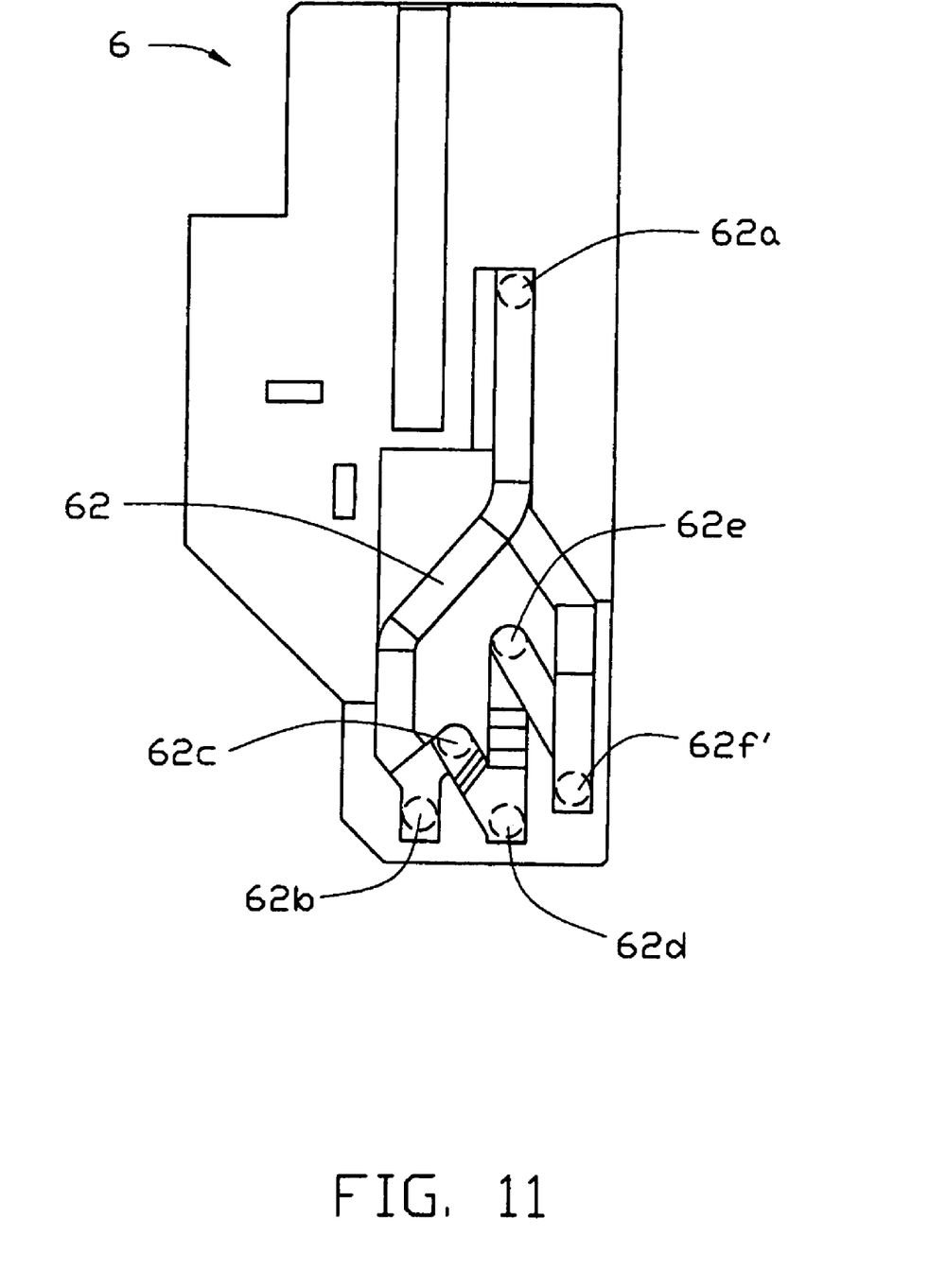
FIG. 11 is an alternative embodiment of the slider of the card connector.

FIG. 11 shows a second embodiment of the card connector 100, which differs from the previous embodiment in the cam groove 62 of the slider 6. The third end point 62f through which the guide end 93 travel to reach the starting point 62a during ejection of the card 5, is arranged between the second recessed portion 62e and the second end point 62d. Compared with the largest extent of elastic deformation of the coil spring 10 when the guide end 93 abuts against the second end point 62d, the extent of elastic deformation of the coil spring 10 when the guide end 93 abuts against the third end point 62f is reduced, thus, the ejecting force of the spring 10 decreases and the card 5 with the slider 6 can move smoothly, thus preventing the card 5 from being ejected out of the card connector 100 too fast.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector for receiving a card, comprising:
    an insulative housing defining a card receiving space;
    a plurality of contacts mounted in the insulative housing to contact with the card;
    an eject mechanism comprising:
        a slider movably mounted on the housing and engageable with the card;
        a spring biasing the slider to move in a direction opposite to an insertion direction of the card;
        a cam mechanism comprising an cam and a cam groove formed around the cam, the cam groove defining a starting point, the cam defining a first recessed portion and a second recessed portion, both the first recessed portion and the second recessed portion communicating with the cam groove; and
        a pin member having a guide end movable within the cam groove to restrict movement of the slider and disengages from the first recessed portion and the second recessed portion in an orderly manner upon ejection of the card, wherein the first recessed portion configured to retain the guide end in a first position of the cam groove when the card is in use, the second recessed portion configured to retain the guide end in a second position of the cam groove upon ejection of the card which is essentially an intermediate position prior to full rejection of the card.

2. The card connector as claimed in claim 1, wherein the second recessed portion is located between the starting point and the first recessed portion along a lengthwise direction of the slider.

3. The card connector as claimed in claim 1, wherein the first recessed portion and the second recessed portion are of V-shape.

4. The card connector as claimed in claim 1, wherein the cam groove comprises three end points which are the most distant from the starting point along a lengthwise direction of the slider, the first and second recessed portion being located between the three end points and the starting point along the lengthwise direction of the slider and positioned between every two adjacent end points respectively along a lateral direction of the slider.

5. The card connector as claimed in claim 1, wherein the cam groove comprises a first end point cooperating with the pin member to define full extent of forward movement of the slider, a third end point, a second end point located between the first end point and the third end point along a lateral direction of the slider, the first recessed portion is located between the first end point and the second end point along the lateral direction of the slider, the second recessed portion is positioned between the second end point and the third end point along the lateral direction of the slider, both the first recessed portion and the third end point is located between the first end point and the second recessed portion along a lengthwise direction of the slider.

6. The card connector as claimed in claim 5, further comprising a switch having a stationary terminal and a movable terminal having a deflectable arm to contact with the stationary terminal.

7. The card connector as claimed in claim 6, wherein the stationary terminal is positioned beneath the deflectable arm of the movable terminal.

8. The card connector as claimed in claim 6, further comprising an island portion and a guide groove formed around the island portion to actuate the deflectable arm of the movable terminal to connect with the stationary terminal.

9. The card connector as claimed in claim 8, wherein the guide groove is formed on a side surface of the slider and defines an upper passage, a below passage located beneath the upper passage and two connecting passages interconnecting the upper and below passage and being spaced from each, the deflectable arm has a bent end movable within the guide groove, when the guide end reaches the first end point of the cam groove, the bent end travels from the upper passage to slide into the below passage to make the deflectable arm contact with the stationary terminal, when the guide end escapes from the first recessed portion and the second end point to be retained by the second recessed portion, the bent end travels from the below passage to slide into the upper passage to make the deflectable arm disengage from the stationary terminal while the card keeps in contact with the contacts.

10. A card connector for receiving a card, comprising:
    an insulative housing having a receiving space to receive the card;
    a plurality of contacts mounted in the insulative housing to contact the card;
    an eject mechanism comprising:
        a slider movably mounted on the housing and engageable with the card;
        a spring biasing the slider to move in a direction opposite to an insertion direction of the card;
        a cam mechanism comprising an earn and a cam groove formed around the cam, the groove having a starting point, a first end point which are the most distant from the starting point and a second end point, the cam having a recessed portion being located between the starting point and the first end point along a lengthwise direction of the slider and positioned between the first end point and the second end point along a lateral direction of the slider, the second end point located between the first end point and the recessed portion along the lengthwise direction of the slider; and a pin member having a guide end movable within the cam groove to restrict movement of the slider and to be retained in the recessed portion when the card is in use and to pass through the starting point, the first end point, the recessed portion and the second end point orderly, the first end point cooperating with the pin member to define full extent of the forward movement of the slider, both the first end point the second end point adapted to abut against the guide end in the insertion direction of the card.

11. The card connector as claimed in claim 10, wherein the cam and the cam groove are formed on an upper side surface of the slider.

12. The card connector as claimed in claim 10, wherein the recessed portion is provided with two V-shaped cutouts communicating with the cam groove.

13. The card connector as claimed in claim 10, further comprising a switch having a stationary terminal and a movable terminal having a deflectable arm to contact with the stationary terminal.

14. The card connector as claimed in claim 13, wherein the stationary terminal is positioned beneath the deflectable arm of the movable terminal.

15. The card connector as claimed in claim 13, wherein the slider defines an island portion and a guide groove formed around the island portion to actuate the deflectable arm of the movable terminal to contact with the stationary terminal.

16. The card connector as claimed in claim 15, wherein the guide groove comprises an upper passage, an below passage located beneath the upper passage and two connecting passages interconnecting the upper and below passage and being spaced from each other.

17. A card connector assembly comprising:
an insulative housing having a receiving space to receive a card;
a plurality of contacts mounted in the insulative housing to contact the card;
a set of switch contacts essentially located by a lateral side of the receiving space;
an eject mechanism comprising:
a slider movably relative to the housing and engageable with the card;
a spring biasing the slider to move in a direction opposite to an insertion direction of the card;
a set of cam structure formed on the slider to determine an on-off status of the switch contacts; wherein said slider further includes another set of cam structure spaced from the set of cam structure to determine at least two retention positions of the slider relative to the housing.

18. The card connector assembly as claimed in claim 17, wherein the set of cam structure and said another set of cam structure are respectively located on different faces of the slider directing to different directions.

19. The card connector assembly as claimed in claim 17, wherein upon ejection the card, the set of switch contacts is activated prior to disengagement between the card and the contacts.

20. The card connector assembly as claimed in claim 17, wherein said set of switch contacts includes a deflectable terminal having thereof a portion guidably moved in a guiding groove in said set of cam structure.

* * * * *